Figure 1:
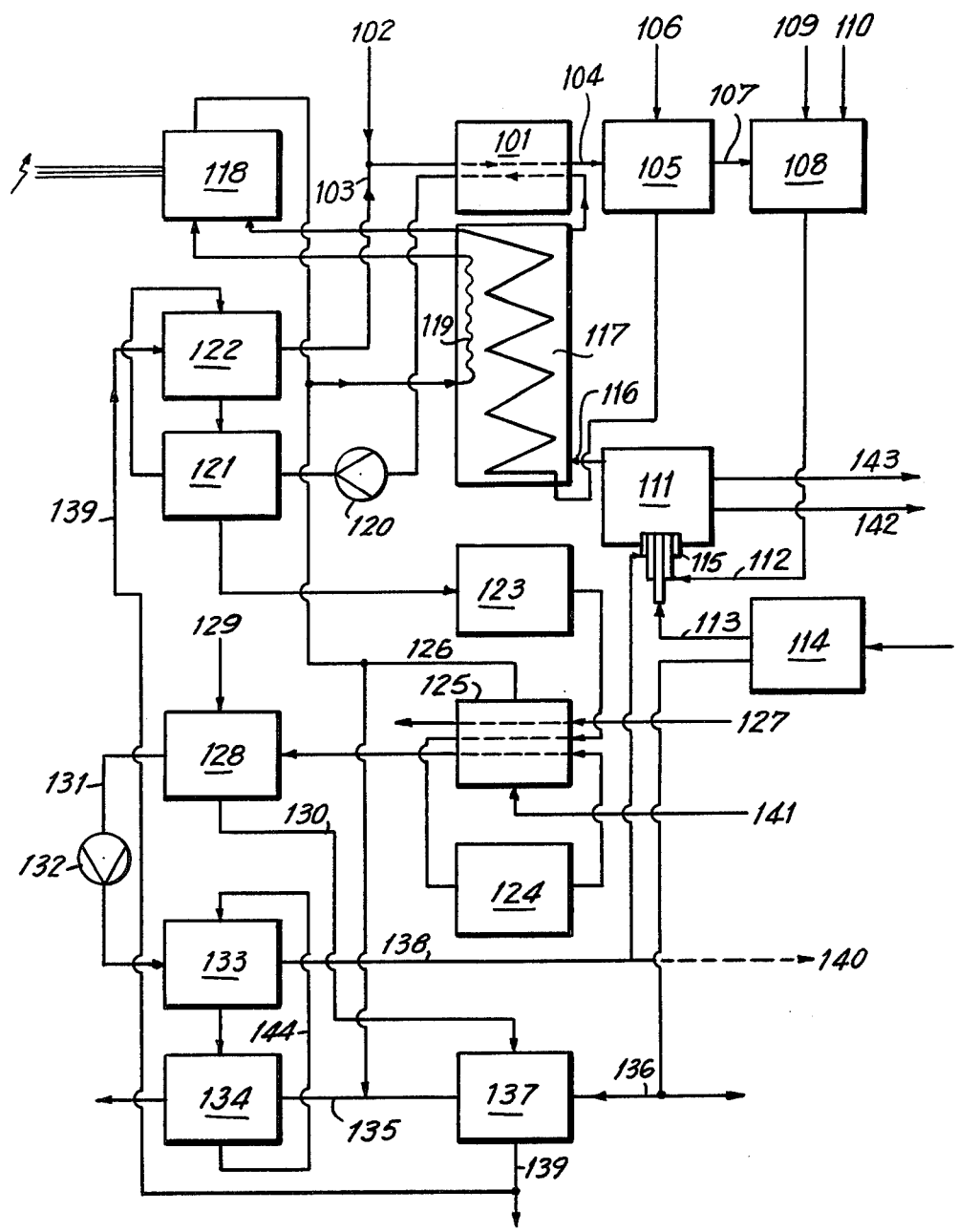

United States Patent [19]
Collin

[11] 4,131,452
[45] Dec. 26, 1978

[54] METHOD FOR DIRECT MANUFACTURE OF CRUDE STEEL

[75] Inventor: Per H. Collin, Falun, Sweden

[73] Assignee: Stora Kopparbergs Bergslags AB, Falun, Sweden

[21] Appl. No.: 777,554

[22] Filed: Mar. 14, 1977

[30] Foreign Application Priority Data

Mar. 17, 1976 [SE] Sweden .............................. 7603359

[51] Int. Cl.² .............................................. C21C 7/00
[52] U.S. Cl. ............................................ 75/60; 75/59
[58] Field of Search ........................ 75/60, 59, 11, 12

[56] References Cited
U.S. PATENT DOCUMENTS

| | | | |
|---|---|---|---|
| 3,776,533 | 12/1973 | Vlnaty | 75/26 |
| 3,902,889 | 9/1975 | Malin | 75/12 |
| 3,942,978 | 3/1976 | Oberg | 75/12 |

*Primary Examiner*—P. D. Rosenberg
*Attorney, Agent, or Firm*—Curtis, Morris & Safford

[57] ABSTRACT

A method for making crude steel has been disclosed where the crude steel is obtained by melt reduction using as raw materials fine grained oxide containing material, fine grained solid, liquid and/or gaseous fuels and oxygen gas; the method comprises the following interrelated steps of feeding the reaction materials into a molten steel bath through at least one compound nozzle, each of which has a central opening and two concentrically surrounding annular slits, injecting said iron oxide containing material, wherein the same may be prereduced to FeO, by admixing said iron oxide material with a fuel including fine grained slag formers, said injecting of the iron oxide, fuel or slag formers being into the steel bath through the inner annular slit at such a depth under the surface of the bath that said iron oxides become melt reduced before these reach the surface of the bath, injecting oxygen, at the same time as said iron oxide containing material, fuel or slag formers are being injected, through the central, circular opening and injecting hydrogen, through the outer annular slit at such a rate that the heat requirement for the melt reduction is satisfied by partial combustion in the bath of hydrogen and carbonaceous material in said fuel and producing reaction gas thereby, utilizing a part of a heat content of said reaction gas and utilizing said reaction gas for said prereduction of the iron oxide containing material, catalytically converting to $H_2$ the reaction gas leaving the steel bath, separating from said catalytically converted $H_2$ gas, $CO_2$ and $H_2O$, said residual gas thus being obtained consisting of hydrogen, which is injected through the inner annular slit of said compound nozzle.

5 Claims, 3 Drawing Figures

METHOD FOR DIRECT MANUFACTURE OF CRUDE STEEL

The present invention relates to a method for manufacture of crude steel and at the same time optionally hydrogen and/or ammonia. The raw materials for carrying out the method are fine-grained, iron oxides containing materials, fine-grained solid, liquid or gaseous fuels and oxygen gas.

According to the invention, fine-grained, iron oxides containing materials are intended to mean, for instance, iron ore concentrates, blue billies (roasted pyrites) and more or less pre-reduced products thereof. For the pre-reduced products, generally it is intended that these have a mole quotient O/Fe about 0.9 to 1.1. The fine-grained materials have a grain size <1 mm, suitably <0.5 mm, and preferably <0.2 mm as an average grain size.

By fine-grained fuels are understood, for example, fine-grained carbonaceous materials such as lignite, coal, char, etc., with a grain size <1 mm suitably <0.5 mm and preferably <0.3 mm as an average grain size. By liquid fuels are understood mixtures of hydrocarbons which can be pumped at moderate temperatures such as heating oils, tars, topped crude, etc. By gaseous fuels are understood methane, natural gas, refinery exhaust gases, etc.

The method according to the invention permits, in contrast to presently used commercial methods of steel manufacture, direct manufacture of steel starting from fine-grained, iron oxides containing materials, the energy cost being smaller than for the present commercial methods.

According to the invention, crude steel and optionally hydrogen and/or ammonia are made from fine-grained, iron oxides containing material by means of fine-grained solid, liquid and/or gaseous fuels and oxygen gas by melt reduction in a steel bath. For this purpose the iron oxide containing material, suitably pre-reduced to FeO, in mixture with the fuel and optionally with fine-grained slag formers, is injected through at least one annular slit nozzle at such a depth below the surface of the steel bath such that the iron oxides become melt-reduced before these reach the surface of the bath. At the same time, oxygen gas is injected in the steel bath through a circular nozzle, at the center of the annular slit nozzle, and hydrogen gas through an outer annular slit nozzle around the annular slit nozzle used for the iron oxide containing material. Iron oxides, fuel, oxygen gas and hydrogen gas are introduced at such flow rates that the heat requirement for the melt-reduction is satisfied by partial combustion in the bath. The reaction gas leaving the steel bath (optionally after utilizing part of its heat content and utilizing it for the above mentioned pre-reduction of the iron oxide containing material) is catalytically converted and its component parts of $CO_2$ and $H_2$ are separated; thereby a gas is obtained that in the major part consists of hydrogen, which is injected through the outer annular slit nozzles in the steel bath.

A suitable embodiment of the invention comprises a combination of the following operations:

I. Pre-reduction to FeO of iron oxide material is carried out by reducing the major part of the iron oxide content in an appropriately adjusted stream of fine-grained, iron oxide containing materials, the pre-reduction taking place in one or several stages by means of a reducing gas obtained in accordance to operation VIII below. The pre-reduction is suitably carried out in such a manner that the material is conveyed suspended in gas and is separated therefrom in cyclones, the separated material being, in case of several stages, preferably lead countercurrently to the gas.

II. Cooling of the solid, fine-grained, pre-reduced material obtained according to operation I is carried out conventionally and suitably down to a temperature of <300° C. Thereby the heat content of the pre-reduced material is utilized.

III. Mixing is then carried out with the pre-reduced, fine-grained, solid material, cooled in accordance with operation II, and an appropriately adjusted stream of fine-grained, slag forming material and with a stream of fine-grained, solid, liquid, or gaseous fuels adjusted as described below.

IV. Injecting appropriately adjusted partial streams n ($n \geq 1$) of the mixture obtained according to operation III in a steel bath is the next step, the injection taking place through annular slit nozzles and at such a pre-selected or adjusted depth under the surface of the bath that the iron oxide containing material is melt-reduced before it reaches the surface of the bath.

V. Injecting into the steel bath n partial streams of oxygen gas, adjusted as described below, is accomplished through circular nozzles in the center of the annular slit nozzles according to operation IV and n partial streams of hydrogen gas adjusted, as described below, through annular slit nozzles surrounding the annular slit nozzles according to operation IV. (Wherever the term "adjusted" is used, it is intended to mean controlled, pre-selected, or capable of determination and consequent adjustment.)

VI. Adjusting the streams of carbonaceous material according to operation III and oxygen gas and hydrogen gas according to operation V is practiced so that:

VI:1 the molar relation $H_2/H_2O \geq 1.3$ and $CO/CO_2 \geq 5.4$, respectively, is maintained in the reaction gas which leaves the surface of the bath; and VI:2 the heat generation, by combustion, in the steel bath of (1) the therein injected C (to CO), (2) partial combustion of the therein injected $H_2$ to $H_2O$, and (3) the therein formed CO to $CO_2$ will correspond to the reaction heat for the melt reduction as well as the heat content in the reaction products and the heat losses so that the selected bath temperature is maintained, suitably at 1550°–1770° C.

VII. Controlling of the hot reaction gas is accomplished in a conventional manner (suitably by utilization of the heat content in a steam generator). The hot reaction gas is obtained from the steel bath by reducing the reaction gas to a temperature so adjusted that when employing the reaction gas for pre-reduction according to operation VIII, the obtained lowering of the temperature allows for the heat requirements needed for the pre-reduction (in operation I).

VIII. Utilizing the reaction gas controlled according to operation VII as reducing gas for the pre-reduction according to operation I is part of the process herein.

IX. As part of the process, controlling or mediating the temperature (in a conventional manner), of the gas obtained from the pre-reduction is also included with this process. According to this process, the temperature of the gas from operation I is suitably controlled by cooling, after a moderate increase of the pressure, countercurrently in a heat exchanger, using this gas itself as a cooling medium after dust removal.

X. Converting the CO content of the gas obtained in operation IX again is part of the process. This converting is a conventional water-gas production whereby CO and $H_2O$ are reacted to produce $H_2$ and $CO_2$ (this gas is e. g. wet cleaned and heated in the heat exchanger according to operation IX thereby using $H_2O$). $H_2O$ and $CO_2$ are separated from the converted gas in a conventional manner by condensation and adsorption, respectively; the resulting product being hydrogen with small content of CO, $CO_2$ and $H_2O$.

XI. As part of the process, utilizing hydrogen, obtained according to operation X is encompassed herein, i. e., by injecting a stream of hydrogen according to operation V, while optionally using hydrogen for heating purposes and/or as raw material in chemical manufacture, for instance, for producing of ammonia.

XII. Intermittently or continuously tapping the produced crude steel and slag is practiced in this process, the tapping of the steel being controlled in such a manner that a sufficient depth is maintained in the steel bath for melt reduction according to operation IV described above.

Figure 2:
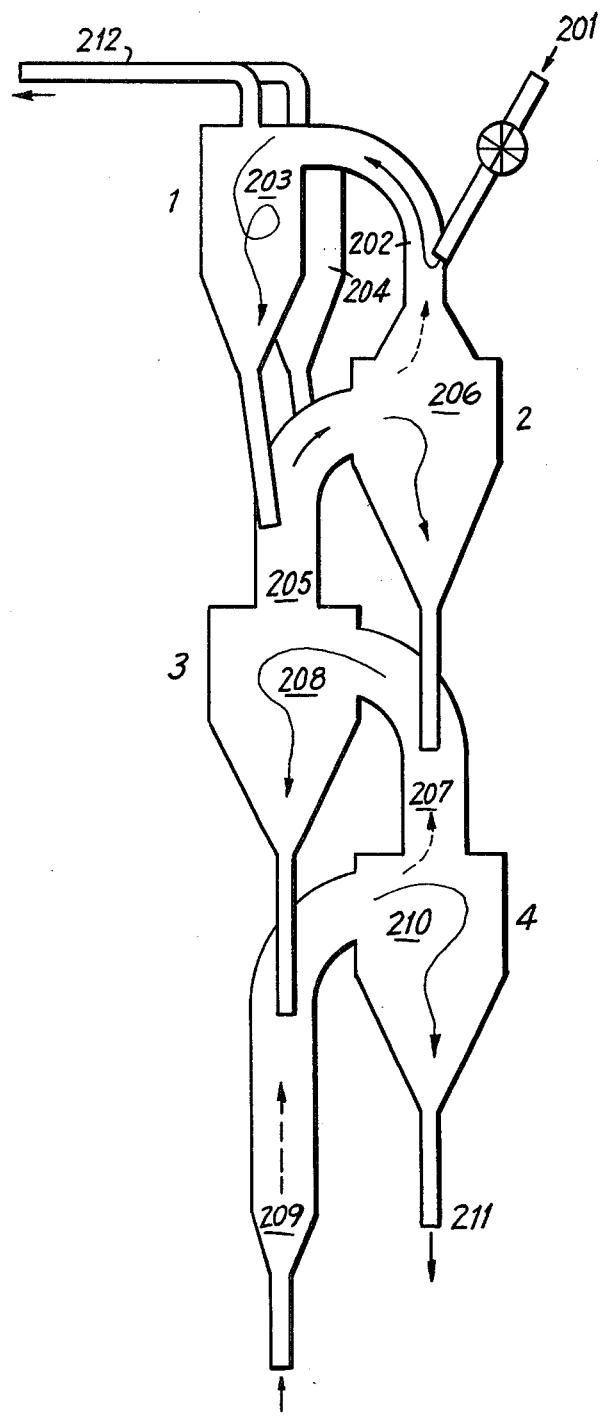
Figure 3:
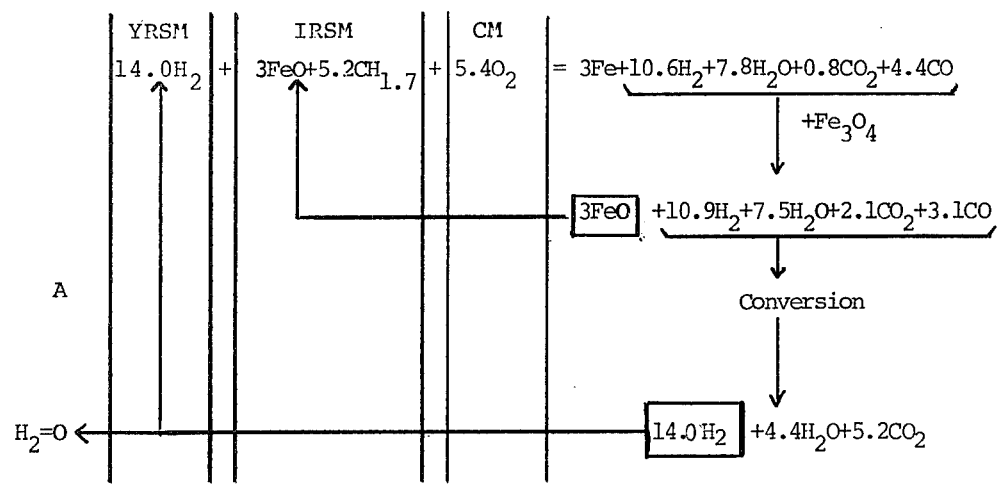
Figure 3:
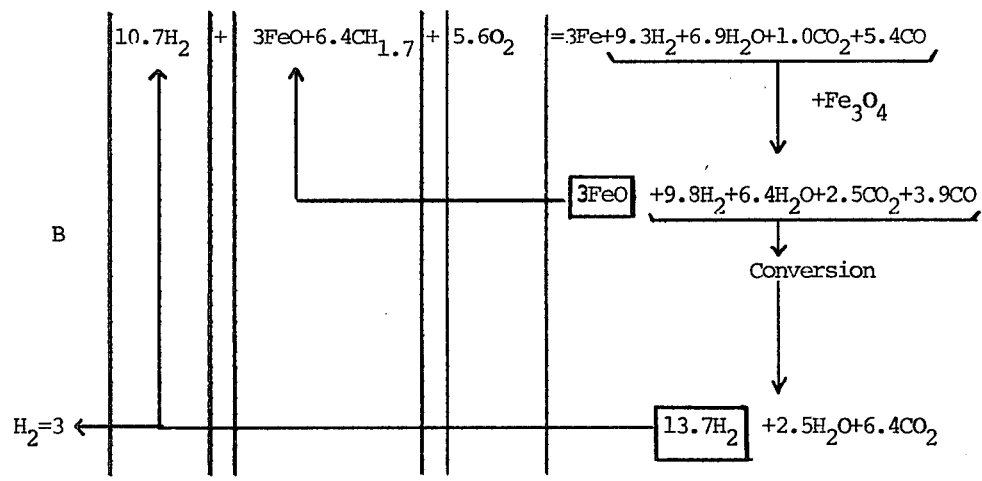
Figure 3:
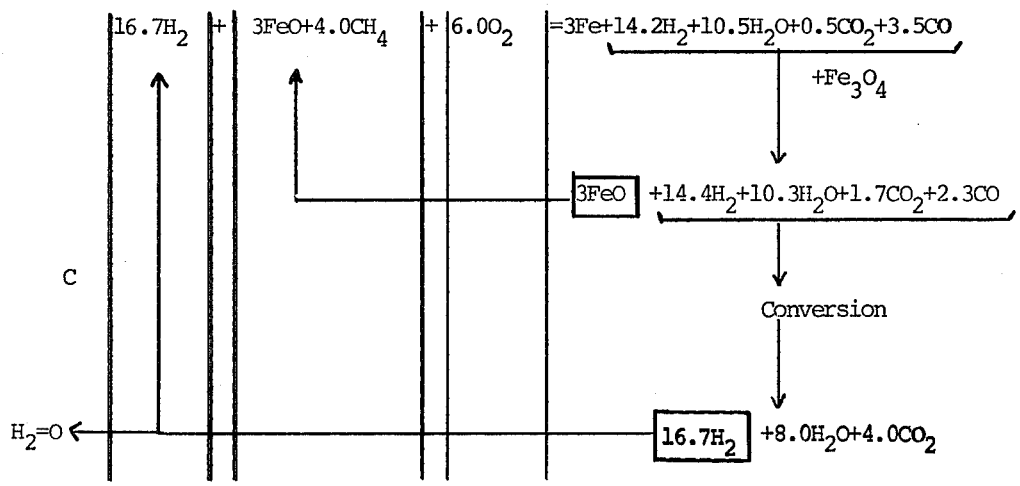

The specific operations and their performance in practice will be described and amplified below in connection with the appended table which depicts schematically reaction formulae for the chemical reactions taking place in the steel bath and the drawings comprising:

FIG. 1, showing a block diagram for an embodiment of the invention;

FIG. 2, showing a preferred embodiment of an apparatus for performing an operation I, and FIG. 3, showing reaction formulae in a tabular form.

Operation I described above is a pre-reduction to FeO by means of a reaction gas which is temperature controlled (i.e., heat content controlled) and obtained from the melt reduction. This operation of iron oxide material is in practice carried out in one or preferably several stages, suitably in the same type of apparatus as is used for preheating particles in suspending gas, e. g., when calcining cement, for instance, according to picture 8, page 17, Ullman, * 3 A 19 BD which is reproduced in FIG. 2.

* Ullmans Encyklopadie der technischen Chemie 3rd edition, volume 19, Munich, Berlin, Vienna 1969, (entry word Zement = cement)

According to the invention, the pre-reduction thus, preferably, takes place with the fine-grained iron raw material suspended in concurrently flowing gas in each stage thereof. Each stage is terminated by separating the solid material in a cyclone and conducing the solid material to the next pre-reduction step, preferably countercurrently to the gas.

In order to avoid excessively high temperature in the iron oxide containing grains, which may lead to so-called sticking or agglomeration, that is, adhesion causing detrimental agglomerates, the reducing gas according to the invention should be controlled or mediated in a manner defined below (see operation VII). That is before the step where gas fed to the pre-reduction is separated from the pre-reduced raw iron material, the reducing gas should be of the appropriate temperature. Because of the content of $H_2O$ and $CO_2$ in the reducing gas, metallic iron cannot be formed during the pre-reduction. This is important because the risk of sticking increases considerably with the formation of metallic iron in the grains of the raw material and especially at the final temperature (800°–850° C.), which is preferred for the pre-reduction because of the reduction speed.

Operation II, which is the cooling of the pre-reduced, fine-grained, FeO containing material, suitably to a temperature <300° C., is in practice done in the most simple way in a fluidized bed of classical type with built-in cooling elements. By using feed water before it is fed to the steam generator, as cooling medium, according to operation VII, the heat content in the pre-reduced material can be utilized in an economical manner.

Operation III, which is the mixing of appropriately adjusted streams of the cooled, fine-grained, pre-reduced material obtained according to operation I with an adjusted or pre-selected feed of fine-grained slag forming materials, for example, lime and a stream, (regulated as described below) or if fine-grained solid, liquid, and gaseous fuels, can take place by means of several mixing methods used in the industry. The desired relation of C/O in the mixture is achieved by a precise control of the feed streams of the respective components for the mixture such as by means of suitable flow regulators.

Operation IV, which is the injecting of the mixture (obtained according to operation III) into a crude steel bath is carried out by different but individually conventional methods depending however on the composition of the mixture.

For example, if the mixture consists of only solid materials, the injection is made by means of a suitable carrier gas in accordance with established practice such as for injecting lime in bottom-blown converters for instance of the Q-BOP (OBM) type.

The injection has been found to be especially simple when the major part of the carbonaceous material is liquid. In this case the mixture can usually be pumped at a suitably selected temperature and can be passed through slit nozzles (previously described) by means of a pump. In this case a low speed in the annular slit can be tolerated because the slit on both sides is surrounded by gas flowing at high speed, (see description below). The low speed in the annular slit provides an advantage of a very low wear at the opening of the slit.

Operation V is the injection of $O_2$ and $H_2$. This operation is carried out according to the usual practice in industry employed with bottom-blown converters. The volumetric flow of $H_2$ always becomes greater than the volumetric flow of $O_2$ and a "tubular jet" injected according to operation IV achieves, at the initial point of its path, a "hydrogen shield" which is inert in relation to the steel bath. This has a great advantage of a very small attack on the injection nozzles, if the gas velocity in the annular slit for $H_2$ and the circular slit for $O_2$ is selected to be sufficiently high.

In connection with industrial adaption of the present invention, it is of course important to try to attain the lowest possible consumption of fuel, oxygen gas and hydrogen gas per produced unit of crude steel. The lowest theoretical consumption of the said materials in obtained at the equilibrum conditions which for instance at 1600° C. corresponds to $H_2/H_2O = 1.3$ and $CO/CO_2 = 5.4$ in the reaction gas which leaves the steel bath. The carbon content in the bath is under these conditions at <0.01% C. In practice it has been found possible to carry out the melt reduction (according to the invention) close to the equilibrium values, which, of course, are interrelated with that of the reaction rate for the melt reduction, because the reaction rate is very high at the very high temperatures in the steel bath.

Operation VI, which is the regulating of the streams of iron raw material, fuel, oxygen gas and hydrogen gas in practice occurs as aided by interrelations explained below, thus making it possible to attain the desired relations among $H_2/H_2O$ and $CO/CO_2$ and the desired temperature of the bath, which is suitably at 1550°–1700° C.

The fuel consumption, suitably calculated as mol $CH_i$ ($0<i<4$) per mol Fe, depends partly on the relation O/Fe in the iron raw material and partly on the H/C quotient of the fuel. The fuel consumption is thus dependent on whether pre-reduction is included or not and on the size of the production unit. As the pre-reduction to FeO brings about a substantial decrease of the fuel consumption, only this illustration is discussed in the following description of the process. Between the flow of fuel and its H/C-quotient, (using, for example, magnetite as iron raw material and producing only crude steel) the following formula is valid:

$$CH_i \approx A(i)^2 + B(i) + C \qquad (1)$$

where
0.05 > A > 0.03
− 0.45 < B < − 0.35
2.1 < C < 2.5 the limits on the left side referring to a large and the limits on the right side to a small production unit.

For a production unit of average size, the formula gives, (utilizing heavy-oil as fuel ($i \sim 1.7$)) a consumption of about 1.7 mol oil/mol Fe corresponding to 430 kg oil/ton of Fe or 4.1 Gcal/ton of Fe. If methane is used as fuel, consumption is about 1.3 mol/mol of Fe corresponding to 540 $Nm^3$/ton of Fe or 4.6 Gcal/ton of Fe, while pure carbon theoretically would give a consumption of 2.3 mol/mol of Fe corresponding to 495 Kg C/ton of Fe or 3.9 Gcal/ton of Fe.

The numbers show that at the same Gcal-price those fuels should be preferred for the invention which have a high content of C and a low content of H.

In case it is desired to produce hydrogen gas, besides the desired crude steel, the fuel consumption is of course increased beyond what is defined in formula (1). As expected there is an almost linear connection between the excess of hydrogen and the fuel consumption. For production units of an average size and using heavy-oil as fuel ($CH_{1.7}$) the following formula is valid:

$$CH_{1.7} \approx 0.4 \cdot H_2 + 1.74 \qquad (2)$$

where $CH_{1.7}$ = mol oil/mol Fe
$H_2$ = mol $H_2$/mol Fe.

In order to attain an excess of hydrogen such as for example about 1.0 mol $H_2$/mol Fe (400 $Nm^3 H_2$/ton of Fe), there is required about 2.1 mol $CH_{1.7}$/mol Fe corresponding to 520 kg oil/ton Fe.

For melt reduction according to the present invention, the required amount of oxygen gas as well as the amount of fuel is dependent on the H/C-quotient of the fuel and the size of the production unit. Here an almost linear relation is also valid, e. g., for a production unit of average size the relation follows the following formula:

$$O_2 \approx 1.66 + 0.08 \, i \qquad (3)$$

where
$O_2$ = mol $O_2$/mol Fe
$i$ = number of atom H/mol C in the fuel.

In this instance and using the previously mentioned example (production of only crude iron, raw material being magnetite, and fuel being heavy-oil $CH_{1.7}$), there is required about 1.8 mol $O_2$/mol of Fe, corresponding to 725 $Nm^3 O_2$/ton Fe.

The required amount of oxygen gas is only slightly influenced by excess hydrogen. Thus, in the above example the flow of oxygen increases from 725 to 750 $Nm^3$/ton Fe when excess hydrogen is increased from 0 to 400 $Nm^3$/ton Fe.

For generating in the bath of steel the necessary amount of heat, (for melt reduction according to the invention) there is injected in the bath, besides fuel, also hydrogen. The required quantity of hydrogen is dependant on the H/C-quotient in the fuel and the size of the production unit. Also in this case there is an almost linear relation, which for a production unit of average size follows the formula:

$$H_2 \approx 3.87 + 0.43 \, i \qquad (4)$$

where
$H_2$ = mol $H_2$/mol Fe
$i$ = number atom H/mol C in the fuel.

In the above example there is thus required, according to the formula, about 4.7 mol $H_2$/mol Fe corresponding to 1870 $Nm^3$/ton Fe. Because of the incomplete combustion, the needed generation of the excess amount of heat (which is required for maintaining the desired temperature of the bath) is beyond the flow of heat generated by the incomplete combustion of injected fuel.

For injection in the bath of crude steel, the required amount of hydrogen decreases when excess hydrogen is produced. This may seem odd but is interrelated to the incomplete combustion of the excess fuel required for generation of the excess of hydrogen. In the above example, the necessary amount of injected hydrogen thus decreases from 1870 to 1430 $Nm^3 H_2$/ton Fe accompanied by a corresponding increase of the excess hydrogen from 0 to 1 mol $H_2$/mol Fe (corresponding to 400 $Nm^3 H_2$/ton Fe). At the same time, there is, according to the above, a requirement for an increase of the injected amount of heavy-oil from 430 to 520 kg/t Fe and a slight increase of the amount of hydrogen (as explained above).

The total amount of reaction gas escaping from the bath of the molten steel remains, due to the above related circumstances, almost independent of the amount of excess hydrogen. This means that in connection with melt reduction, according to the invention, the melt reduction reactor at the same time can serve as a "free gasifier" for fuels. It is a surprising technical and economic advantage for an industry which produces crude steel according to the invention in combination with a chemical industry consuming hydrogen gas or a mixture of $CO/H_2$.

In production of crude steel, by the method according to the invention, the required amounts of fuel, oxygen and hydrogen, for an appropriately adjusted amount of feed streams of Fe in the iron raw material, are determined by the interrelations explained above. In practice, the temperature in the bath is regulated by changing the amount of Fe (in the iron source material) when carrying out the mixing operation III at the same time changing the oxygen feed stream in an amount so that the change in the feed oxygen, bound as oxide in the iron source material, is appropriately compensated. For instance, if the temperature in the molten bath of steel decreases, then the flow of oxygen is increased (or the temperature increases if the flow of iron raw material decreases). The increase in the amount of oxygen gas should be the same as the corresponding decrease of the amount of oxide-bound oxygen in the iron raw material, thereby causing the ratios of $H_2/H_2O$ and $CO/CO_2$, respectively, to remain constant in the exhaust gas.

Operation VII, which is the controlling or mediating of the temperature of the reaction gas leaving the crude molten steel bath whereby a temperature suitable for pre-reduction is achieved, is practiced by conveying the gas through a steam generator where the gas is reduced to such a temperature, (that which is suitable for the pre-reduction) that the heat content in the gas (corresponding to the lowering of the temperature during the pre-reduction) satisfies (1) the heat requirement for heating the fine-grained iron raw material to reaction temperature, suitably 700–900° C., (2) the reaction heat for the pre-reduction to FeO, and (3) the heat losses in connection with this operation. The heat obtained in the steam generator is suitably used for steam production for generating electric energy such as by means of a turbine generator.

Operation VIII illustrates the employment of the reaction gas, controlled according to operation VII above; this gas is used in the pre-reduction according to the description given under operation I.

Operation IX involves the controlling or mediating of the temperature of the gas coming from the pre-reduction according to operation I. This gas, after dust cleaning, suitably in cyclones, is cooled conventionally such as by heat exchange; the gas itself is used as cooling medium after wet scrubbing. The heat exchanger is of suitable size in order to reduce the temperature of the gas, which is also wet-scrubbed, (cleaned by removing dust by liquid) in such a manner that the water used for scrubbing is partly converted to steam during the wet scrubbing. Steam from wet scrubbing and the water content of the gas itself gives sufficient steam which is used for the converting the gas to hydrogen in operation X, suitably the amount is 0.6 to 1.0, preferably 0.7 to 0.8 mol $H_2O$ per mole dry gas, while the gas from the wet scrubbing is cooled to a temperature that is suitable in the conversion operation, suitably at 300 to 450° C., preferably at 330 to 370° C.

Operation X, which is the conventional conversion of a CO containing gas to hydrogen and carbon dioxide, uses the gas from the wet scrubbing and cooling operation described in operation IX above. The conversion is in (operation IX above) catalyst beds in one or more steps, the CO content of the gas being converted by reacting CO with $H_2O$ in the gas forming $H_2$ and $CO_2$. In order to achieve a high degree of conversion, the conversion of the gas takes place suitably in two steps with intermediate cooling in a first section of a steam generator, the gas side of which is divided into several separate sections, the second section being used for cooling the gas from the second conversion step. The steam resulting therefrom is suitably utilized for electrical energy generation together with steam obtained in operation VII.

The converting gas is subsequently purged of its $H_2O$ content (as steam) by cooling, for instance in a tower scrubber (washer). The resulting cooled gas contains $H_2$ and $CO_2$ and a minor amount of CO and $H_2O$ (as steam). The hot water obtained from this scrubbing can suitably be used for heating and moistening the nitrogen gas which is used as stripper gas in the $CO_2$ stripper as described below.

The cooled and substantially $H_2O$-free gas is conventionally freed from its $CO_2$ content, such as by adsorption, suitably under pressure, for example, by a hot potash solution. The potash solution is regenerated, suitably at atmospheric pressure, by stripping off $CO_2$ by means of nitrogen gas, heated and moistened as described above. Nitrogen gas is available in great quantities as a by-product from the manufacture of oxygen necessary when practicing the process according to this invention.

Operation XI involves the utilizing of hydrogen (after removal of $CO_2$) for injection in the steel bath according to operation V. This hydrogen gas contains a few percent of unconverted CO, some $CO_2$ and is saturated with $H_2O$ (as steam) at a low temperature (about 30° C.).

Optionally, an amount of the produced excess hydrogen can be utilized in many ways. It can, for example, be used for heating purposes in a steel industry wherever todays blast furnace gas or coke furnace gas is used. Another use for this hydrogen gas is as a raw material for a chemical industry. Especially advantageous is manufacture of $NH_3$ based on excess $H_2$ and the by-product $N_2$ (obtained from the manufacture of $O_2$). In connection with the above mentioned "free gassifier" and "free nitrogen", the manufacture of $NH_3$ in connection with manufacture of crude steel in accordance with this invention becomes economically very advantageous.

Operation XII is directed to the tapping or removing of the produced steel and slag intermittently or continuously. The continuous tapping is especially suitable for a production with high capacity. When tapping (as long as the injection of reactants goes on), it must be observed that a sufficient depth of the molten bath of steel is always maintained, accordingly, operation IV described in respect to addition of slag formers according to operation III is suitably adapted to provide a slag of basicity of >1.5 suitably >2, preferably 2 to 4. The MgO-content is relatively high with respect to the lining of the reactor. A suitable lining material is melt magnesite or a lining cooled in such way that frozen slag forms a protective layer.

The method according to the invention is further illustrated in connection with FIG. 1 which schematically exemplifies the production of crude steel according to the invention. The data mentioned below refer to a proposed production of 100 kilotons/year of crude steel at a true working time of 7000 hours/year and all mentioned base quantities refer to 1 ton of crude steel All the quantities referred by percent are in percent by weight unless otherwise illustrated.

To the pre-reduction stage illustrated schematically as 101, (operation I) is fed 1650 kg of fine-grained magnetite concentrate 102 having Fe (total) = 69%, by weight, and a gangue content = 5%, by weight, and 45 kg dust 103 from the wet cleaning step 122 (see description below).

The pre-reduction is further illustrated in FIG. 2 and comprises four stages 1 to 4 carried out countercurrently. The solid material 201 is fed into the gas stream 202 which leaves stage 2 and is brought floating (fluidized) by the gas to stage 1 into the cyclones 203 and 204. From this gas the solid material is separated while the gas passes on at 212 to operation IX. The now heated material is fed into the gas stream 205, which leaves stage 3 and is conveyed floating in the cyclone 206 (fluidized) by the gas to stage 2. The heated material is again separated from the gas and is fed into gas stream 207 coming from stage 4 and again is separated by means of cyclone 208 in stage 3. The material thus heated and somewhat reduced is fed into the gas stream 209, controlled to about 860° C., and obtained from the steam generator described in operation VII. Again, this material is conveyed, fluidized by the gas to stage 4 in the cyclone 210. The gas is separated from the material which is now pre-reduced (and heated to about 820° C.). The material is conveyed via conduit 211 for cooling.

The cooling of the pre-reduced material 104 (operation II) is carried out in a fluidized bed 105 of the conventional type with built-in cooling surfaces. Here the material is cooled to a temperature <300° C. by means of feed water 106 which in turn is fed to a steam generator, whereby the heat content of the pre-reduced material is utilized in an economical manner.

The material 107 cooled to <300° C. is now mixed 108, (operation III), with 430 kg heavy-oil 109 and 100 kg CaO 110. The mixture is pumped at a temperature of ~150° C. to the melt reduction reactors 111 (4 e.g. reactors) where, after subdivision into 10 partial streams for each (4 × 10) the mixture is injected via conduit 112 into the crude steel baths through composite (compound) nozzles in the bottom of the reactors. Each of these nozzles have three openings, one central opening (referred above and also in connection with the table and depicted as CM), and concentrically therewith two annular slits or openings. The outer annular slit is referred as YRSM (see FIG. 3) and the inner annular slit as IRSM (see FIG. 3). The 4 × 10 partial streams are injected through the inner annular slit of equally many composite nozzles. Through the central opening 113 of the nozzles is blown is a total of 10 $Nm^3$ $O_2$ obtained from an oxygen plant 114; the pressure in the pipes leading to the nozzles is being maintained at 7 bars. Altogether through the outer slit in the nozzles there is supplied 1870 $Nm^3$ hydrogen, the pressure in the main pipes being maintained at 5 bars.

From the four reactors, (in which the temperature is maintained at 1630° C.), leaving is ~3000 $Nm^3$ of reaction gas 116. The reactors have a diameter of about 5.5 m at the surface of the bath, hence, the gas speed is calculated on the sectional area of the reactors of about 9 m/second or about the same as during the initial phase of the blowing of a Thomas converter.

The reaction gas from the reactors are conveyed directly to a steam generator 117, where the temperature of the gas is lowered to the above mentioned 860° C. thereby producing steam having a high pressure and high temperature (100 bars, 500° C., as described in operation VII). The steam is used to produce electric energy in the reduction from 100 to 30 bars in the high pressure section of a turbine generator 118, after which the steam, together with saturated steam of 30 bars from the converting step, (see below) is intermediately overheated 119 in the steam generator and is brought back to the low pressure part of the turbine generator working between 29 bars and 0.05 bars. The turbine generator which has a total output of ~95.000 kW produces in this connection 800 kWh which satisfies the electricity requirement for manufacture of the above-mentioned volume of oxygen (500kWh) and the energy requirement in connection with compression of gas, from the conversion prior to the eliminating of $CO_2$ as illustrated below, as well as other electricity requirements when practicing the method according to the invention.

When the reaction gas has passed through the steam generator and the pre-reduction, it has a temperature of ~630° C. By means of a compressor 120 the gas is pressurized, after which it is conveyed to a heat exchanger 121 where its temperature is lowered to ~320°, the gas itself being used as cooling medium after wet scrubbing 122 to remove dust. Wet scrubbing is carried out, for example, in a venturi washer, wherein water 139 of about 60° C. obtained from another part of the process is being used as washing fluid. The gas is thereby cooled to ~80° C. at the same time as its content of water (as steam) is increased to ~0.75 mole $H_2O$/mole dry gas, after which it serves as cooling medium in a heat exchanger. Selecting a suitable size for the heat exchanger 121 allows the gas therein to be heated to ~350° C. and this gas is then introduced at this temperature into the subsequent converting unit.

In the converting unit, (operation X), which works in two steps 123 and 124, (with intermediate cooling therebetween in order to attain a high degree of conversion) the CO-content of the gas is reacted with a part of its $H_2O$ content by aid of catalysts thus producing $H_2$ and $CO_2$ (a water-gas reaction and catalysts therefor are well known). The intermediate cooler, steam generator 125 is in the form of a steam generator (with feed water supply designated at 141). The cooler-steam generator is subdivided into several sections separated on the gas side, and is utilizing partly the heat developed during the converting reaction and partly the heat content of the gas being cooled to 125° C., thereby producing saturated steam 126 of 30 bars.

The steam quantities that the reaction gas produces in the cooler-steam generator 125 and the reactor-steam generator 117 are insufficient for producing in the turbine generator 118 all of the electrical energy that is required in connection with the method according to the invention. In order to satisfy the deficiency of ~155 kWh, ~35 kg heavy-oil 127 is burned in a separate third section of the conversion steam generator 125, which then gives the required additional steam, i.e. energy.

The gas from the conversion unit is then conveyed to a washer 128 where its $H_2O$ content is condensed by washing with cold water 129. The obtained hot water 130 is used as explained (herein) below.

The gas 131, cooled and freed from $H_2O$ (as steam), is then compressed in compressor 132 in two steps (with intermediate cooling) to 5 bars, which consumes ~215 kWh; this compressed gas is then conveyed into an absorption tower 133, where its contents of $CO_2$ is absorbed in a potash solution 144. The latter is regenerated 134 at atmospheric pressure by stripping $CO_2$ from the potash solution by means of warm wet nitrogen gas 135, which is available as an excess by product from the oxygen plant 114. The heating and moistening of the nitrogen gas 136 takes place in a washing tower 137 by means of hot water 130 from the above-mentioned water washer 128.

The gas 138 from the $CO_2$-absorption unit consists of 90% of hydrogen. This gas contains a few percents of CO and $H_2O$ (as steam) and about a percent of $CO_2$. This hydrogen gas is used for injection into the steel bath according to the above described method, while excess hydrogen 140 if any is present is led away. Crude steel 142 and slag 143 are tapped off at regular intervals.

In order to illustrate further the method practiced according to the invention, schematic reaction formulae have been set forth in FIG. 3 in the table therein. These formulae illustrate the chemical processes in the steel bath, in the pre-reduction stage of the process, and in the conversion stage of the process. The left columns refer to the materials fed into the reactor through the compound nozzle having three openings, one central circular opening and two concentrically surrounding slits. Column YRSM shows $H_2$ blown into the melt through the outer annular slit, (hereinafter referred as YRSM). Column IRSM shows the material being blown through the inner annular slit into the melt (hereinafter referred as IRSM). Column CM shows $O_2$ blown in through the central hole (hereinafter referred as CM). The right column shows the iron and gas mixture leaving the converter, the latter being used first for reduction of $Fe_3O_4$ which was introduced in IRSM, the gas being then converted, after which the obtained hydrogen is entirely or partially piped into YRSM.

The numbers in the equations refer to mole units for the materials. The formulae exemplify the reactions at a production capacity of about average size and magnetite as iron raw material, heavy-oil (A) or methane (C) as fuel and also in one illustration (B) comprising the production of excess hydrogen (besides crude steel). The reaction heat, which develops according to the reactions illustrated in the table, corresponds to the heat content in the discharged reaction products at about 1600° C. and the heat losses occuring in the melt reduction.

As appears from the formulae in all cases, the ratios are for $H_2/H_2O \sim 1.4$ and $CO/CO_2$ 5.5 (in the reaction gas coming from the steel bath) while at the same time the condition necessary for equilibrum of water gas is met in accordance with the pre-reduction ($K_2 \sim 1.0$ corresponding to 820° C.). The formulae correspond in other respects to the examples illustrated in the above description of the invention and confirm also the above-mentioned interrelation between the quotient H/C in the fuel and the requirement for fuel, hydrogen and oxygen per mole of crude steel produced.

The total consumption of energy in the above described example, (no excess hydrogen is produced), is 460 kg heavy-oil or 4.5 Gcal/t Fe.* For an energy expenditure of Swedish crowns (kr) 30 kr/Gcal for the oil; this corresponds to 135 kr/ton of liquid crude steel. This should be compared with the cost for a production unit of average size according to the conventional method including sintering plant, blast furnace BOF (LD) plant, the energy consumption of the latter units being as follows:

|  | Coke | Oil | Gas | Electricity | Total |
|---|---|---|---|---|---|
| Sintering | 0.560 | 0.560 |  | 0.065 | 0.675 |
| Blast furnace | 2.080 | 0.800 |  | 0.155 | 3.035 |
| LD |  |  | 0.100 | 0.180 | 0.280 |

* Gcal (Gigacal) = billion ($10^9$) cal.

The following prices obtain at present (for purposes of these calculations):

|  | Kr/Gcal |
|---|---|
| Lump coke | 67 |
| Coke breeze | 42 |
| Oil | 30 |
| Gas | 35 |

Assuming that part of the electric energy is produced from the blast furnace gas, the cost for the total energy consumption is 206 Kr/tonFe for the conventional manufacturing method of crude steel or ~53% more than for the above described example when practicing the method according to the present invention. Moreover the method according to the present invention requires a lower investment of capital than the one required for the conventional method described above.

A further substantial advantage of the method according to the invention is that there is very small sulfur discharge to the atmosphere.

I claim:

1. A method for making of crude steel by melt reduction, using as raw materials fine grained, iron oxide containing material, fine grained solid, liquid, and gaseous fuels and mixtures of said fuels and oxygen gas wherein fine grains are of a size less than 1 mm, comprising the steps of feeding the reaction, materials into a molten steel bath through at least one compound nozzle, each of which has a central opening and two concentrically surrounding annular slits, injecting said iron oxide containing material or iron oxide materials wherein the same are pre-reduced to FeO, by admixing said iron oxide materials with a fuel including fine grained slag formers, said injecting of the iron oxide, fuel and slag formers being into the steel bath through the inner annular slit at such a depth under the surface of the bath that said iron oxides become melt reduced before these reach the surface of the bath, injecting oxygen, at the same time as said iron oxide containing material, fuel and slag formers are being injected, through the central, circular opening and injecting hydrogen, through the outer annular slit at such a rate that the heat requirement for the melt reduction is satisfied by partial combustion in the bath of hydrogen and carbonaceous material in said fuel and producing reaction gas thereby, utilizing a part of a heat content of said reaction gas and utilizing said reaction gas for said pre-reduction of the iron oxide containing material, catalytically converting to $H_2$ the reaction gas leaving the steel bath, separating from said catalytically converted $H_2$ gas, $CO_2$ and $H_2O$, said residual gas thus being obtained consisting of hydrogen, which is injected through the outer annular slit of said compound nozzle.

2. The method defined in claim 1, wherein the pre-reduction to FeO is carried out in one or more stages in such a manner that an iron oxide containing material is conveyed suspended in a gas and is separated from said gas in cyclones, the separated material being, in the event of several stages, conveyed countercurrently to the gas.

3. The method as defined in claim 1, wherein the cooling according to step II is carried out in a fluidized bed with built-in cooling elements, a cooling medium therefor being used a feed water to a steam generator interconnecting to said utilizing of a heat content of said reaction gases leaving said steel bath as defined in step VII.

4. The method as defined in claim 1, wherein said manufacture of crude steel according to said process is interconnected with manufacture of $NH_3$, said starting materials being therefor excess hydrogen as obtained in step XI and nitrogen, said nitrogen being obtained from the $O_2$ manufacture in combination with the process for making crude steel.

5. The method as defined in claim 1, wherein the process combination comprises the following steps:

I. Pre-reducing a major portion of the iron oxide content of fine grained materials containing iron oxide FeO in a pre-selected feed stream said pre-reducing step being carried out by means of a reducing gas obtained in the process according to step VIII said pre-reducing being carried out below in at least one stage;

II. Cooling to a temperature $<300°$ C., the solid fine grained material pre-reduced according to step I, thereby utilizing a part of the heat content of said pre-reduced material;

III. Mixing the pre-reduced fine grained material cooled according to step II with a pre-selected feed stream of a fine grained slag forming material and a feed stream of fine grained solid, liquid, gaseous fuel, and mixtures thereof;

IV. Injecting n, and wherein $n \geq 1$, pre-selected partial feed streams, of the mixture obtained according to III in a molten steel bath, said injecting being through annular slit nozzles and at a depth below the surface of the bath, such that the iron oxides become melt reduced before these reach the surface of the steel bath;

V. Injecting further in the steel bath n partial streams of oxygen, said injecting being through a circular nozzle in the center of said annular slit nozzle defined in step IV and further injecting partial feed streams of hydrogen, through said annular slit nozzle circumferentially surrounding the annular slit nozzle defined in step IV;

VI. Regulating the feed stream of carbonaceous material according to step III, and said feed streams of oxygen and hydrogen according to step V such that, VI.1 the mole reaction $H_2/H_2O \geq 1.3$ and $CO/CO_2 \geq 5.4$ is maintained in a reaction gas leaving the surface of the steel bath;

VI.2 the heat development by combustion in the steel bath of therein injected C to CO, partial combustion of there injected $H_2$ to $H_2O$ and therein formed CO to $CO_2$ does correspond to
(1) the reaction heat for the melt reduction,
(2) the heat content in the reaction products and
(3) the heat losses, whereby a desired temperature of suitably 1550°–1650° C. is maintained in the steel bath;

VII. Controlling the temperature as well as utilizing the heat content thereof of said hot reaction gas leaving the steel bath, said temperature being so adjusted that when the gas is used for pre-reduction, according to step VIII below, the resulting lowering of the temperature corresponds to the heat requirement for the pre-reduction;

VIII. Utilizing the reaction gas, controlled for its temperature according to step VII, as a reducing gas for the pre-reduction defined in step I;

IX. Further controlling the gas coming from the pre-reduction as defined in step I by countercurrently heat exchanging the gas whereby said gas is a cooling medium, said gas being first separated of dust contained therein;

X. Converting by water-gas reaction, said gas coming from step IX whereby $H_2$ and $O_2$ is obtained including eliminating $H_2O$ and $CO_2$ therefrom by condensation and adsorption, respectively, whereby hydrogen with small amounts of CO, $CO_2$ and $H_2O$ is obtained;

XI. Injecting a required feed stream of hydrogen, obtained according to step X, as defined in step V, whereby an excess flow of the hydrogen, if obtained, is further utilized as a source material; and XII. Intermittently or continuously tapping a steel and a slag product, each tapping being controlled such that sufficient depth of the bath is maintained according to step IV.

* * * * *